2,992,898
PREPARATION OF CARBONYL SULFIDE
Fred Applegath and Raymond A. Franz, El Dorado, Ark., assignors to Monsanto Chemical Company, St. Louis, Mo., a corporation of Delaware
No Drawing. Filed Jan. 2, 1959, Ser. No. 784,444
6 Claims. (Cl. 23—203)

This invention relates to carbonyl sulfide and more particularly to an improved process for its preparation.

It is known in the art that carbonyl sulfide (COS) can be prepared by reacting carbon monoxide and sulfur at very high temperatures such as from 675°–840° C. However, when carbon monoxide is passed through molten sulfur at low temperatures, such as from 130°–240° C., no COS is formed. It is an object of this invention to provide a process for preparing COS from CO and S at relatively low temperatures. Other objects of this invention will become apparent from the description of the invention.

According to this invention, COS is prepared by reacting CO with S dispersed in a liquid reaction medium consisting essentially of a hydroxy substituted tertiary aliphatic amine. The following examples illustrate this invention.

Example I

Into a 1.8 liter stainless steel bomb is charged 200 ml. of triethanolamine, 16 g. of sulfur and CO to a pressure of about 100 p.s.i.g. The bomb is heated to a temperature of about 100° C. for two hours and the product gases released from which is recovered by cooling to Dry Ice temperatures, a good yield of COS.

Example II

The procedure set forth in Example I is repeated using N,N-dimethylethanolamine as the reaction medium. A good yield of COS is obtained.

Example III

The procedure set forth in Example I is repeated using N,N-diisopropylethanolamine as the reaction medium. A good yield of COS is obtained.

Example IV

The procedure set forth in Example I is repeated using N-hydroxyethylmorpholine as the reaction medium. A good yield of COS is obtained.

Example V

The procedure set forth in Example I is repeated using tetrahydroxyethylethylenediamine as the reaction medium. A good yield of COS is obtained.

Example VI

The procedure set forth in Example I is repeated using N,N-dibutylisopropanolamine as the reaction medium. A good yield of COS is obtained.

Example VII

The procedure set forth in Example I is repeated using triisopropanolamine as the reaction medium. A good yield of COS is obtained.

Example VIII

The procedure set forth in Example I is repeated using di-(2-ethylhexyl)-ethanolamine as the reaction medium. A good yield of COS is obtained.

Example IX

The procedure set forth in Example I is repeated using dimethylisopropanolamine as the reaction medium. A good yield of COS is obtained.

Example X

The procedure set forth in Example I is repeated using N-butyldiisopropanolamine as the reaction medium. A good yield of COS is obtained.

Example XI

The procedure set forth in Example I is repeated using N-ethyldiethanolamine as the reaction medium. A good yield of COS is obtained.

Example XII

The procedure set forth in Example I is repeated using N-3-hydroxypropylmorpholine as the reaction medium. A good yield of COS is obtained.

Example XIII

The procedure set forth in Example I is repeated using N-4-hydroxybutylmorpholine as the reaction medium. A good yield of COS is obtained.

Any liquid hydroxy-substituted tertiary aliphatic amine can be used in the practice of this invention. The aliphatic amine can be acyclic, alicyclic or heterocyclic as shown in the examples. Mono-hydroxy or polyhydroxy-substituted tertiary aliphatic amines are equally applicable.

The quantity of amine used can be varied substantially and is governed by that amount necessary to provide a reaction medium of sufficient fluidity to permit good contact of the reactants. Either of the reactants, CO and S, can be used in excess, the amount not being a critical factor. Generally, for practical reasons, sulfur is employed in excess of the stoichiometric requirement.

The advantage of the instant process is the use of low reaction temperatures. Temperatures in the range of from about 25° C. to about 300° C. can be used with temperatures in the range of from about 70° C. to about 150° C. being preferred.

Reaction pressure is not a critical factor although pressures above atmospheric are preferred. Pressures ranging from atmospheric to 2000 p.s.i.g. can be used with pressures ranging from 50 p.s.i.g. to 500 p.s.i.g. being preferred.

The reaction can be carried out as a batch process as shown in the examples or it can be carried out as a continuous process in a suitable column providing for good concurrent or countercurrent contacting means.

COS can be recovered from the reaction gases by any convenient method well known to those skilled in the art. It can be condensed out by cooling to Dry Ice temperatures or it can be recovered by solvent extraction.

What is claimed is:

1. A process for producing carbonyl sulfide which comprises reacting carbon monoxide with sulfur dispersed in a liquid reaction medium consisting essentially of a hydroxy substituted tertiary aliphatic amine at a temperature in the range of from about 25° C. to about 300° C.
2. A process as described in claim 1 wherein the amine is triethanolamine.
3. A process as described in claim 1 wherein the amine is N-hydroxyethylmorpholine.
4. A process as described in claim 1 wherein the amine is N,N-dimethylethanolamine.
5. A process as described in claim 1 wherein the amine is triisopropanolamine.
6. A process as described in claim 1 wherein the amine is N-ethyldiethanolamine.

References Cited in the file of this patent
UNITED STATES PATENTS

| | | |
|---|---|---|
| 2,080,360 | Lepsoe | May 11, 1937 |
| 2,728,638 | Morningstar | Dec. 27, 1955 |
| 2,767,059 | Adcock et al. | Oct. 16, 1956 |

OTHER REFERENCES

Mellor: "Comprehensive Treatise on Inorganic and Theoretical Chemistry," vol. 5, pages 972–3, 1924.